United States Patent
Trumbore et al.

(10) Patent No.: US 6,488,988 B2
(45) Date of Patent: Dec. 3, 2002

(54) METHOD OF REDUCING FUMES FROM A VESSEL OF MOLTEN ASPHALT

(75) Inventors: Dave C. Trumbore, LaGrange, IL (US); Jorge A. Marzari, Holland, MI (US); Dave R. Jones, Tampa, FL (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 130 days.

(21) Appl. No.: 09/733,887

(22) Filed: Dec. 8, 2000

(65) Prior Publication Data

US 2002/0094392 A1 Jul. 18, 2002

Related U.S. Application Data

(63) Continuation-in-part of application No. 09/169,964, filed on Oct. 13, 1998.

(51) Int. Cl.⁷ .................................. B05D 3/02
(52) U.S. Cl. ................ 427/376.1; 427/331; 427/375; 427/376.1; 428/543
(58) Field of Search ................ 427/331, 136, 427/138, 372.2, 374.2, 374.4, 376.1; 428/70, 543, 221, 295

(56) References Cited

U.S. PATENT DOCUMENTS

| | | | |
|---|---|---|---|
| 2,287,849 A | 6/1942 | Wilson | |
| 2,572,959 A | 10/1951 | Sparks et al. | |
| 2,639,808 A | 5/1953 | Barry et al. | |
| 2,762,504 A | 9/1956 | Sparks et al. | |
| 3,216,566 A | 11/1965 | Rosenthal | |
| 3,366,233 A | 1/1968 | Roediger | |
| 3,564,808 A | 2/1971 | Kent | |
| 3,832,825 A | 9/1974 | Dunbar | |
| 3,837,778 A | 9/1974 | Parker | |
| 3,851,438 A | 12/1974 | Brisman | |
| 3,900,102 A | * 8/1975 | Hurst | 206/411 |
| 3,987,602 A | 10/1976 | Stahl | |
| 4,073,760 A | 2/1978 | Harris et al. | |
| 4,137,692 A | 2/1979 | Levy | |
| 4,450,962 A | 5/1984 | Matthews et al. | |
| 5,109,892 A | 5/1992 | Somers | |
| 5,307,608 A | 5/1994 | Muir et al. | |
| 5,452,800 A | 9/1995 | Muir | |
| 5,470,455 A | 11/1995 | Santos | |
| 5,733,616 A | 3/1998 | Janicki et al. | |
| 5,765,686 A | 6/1998 | Wright et al. | |
| 5,989,662 A | 11/1999 | Janicki et al. | |
| 5,992,628 A | 11/1999 | Vermilion et al. | |

\* cited by examiner

*Primary Examiner*—Michael Barr
*Assistant Examiner*—Rebecca A. Blanton
(74) *Attorney, Agent, or Firm*—Inger H. Eckert; James J. Dottavio

(57) ABSTRACT

A method and container for reducing fuming of asphalt in a heated vessel, including placing asphalt in a heated vessel to heat the asphalt to a molten state, adding a blanket material to the asphalt, the blanket material being substantially insoluble in the molten asphalt to form a skim thereon to reduce fuming therefrom.

16 Claims, 2 Drawing Sheets

METHOD OF REDUCING FUMES FROM A VESSEL OF MOLTEN ASPHALT

CROSS-REFERENCE TO RELATED APPLICATIONS

This application is a continuation-in-part of copending U.S. Ser. No. 09/169,964 to Marzari et al., filed Oct. 13, 1998.

TECHNICAL FIELD AND INDUSTRIAL APPLICABILITY OF THE INVENTION

This invention relates in general to asphalt materials for use in roofing, paving and other applications. More particularly, this invention relates to a container and method to produce such a container, for reducing fumes emitted from a vessel of the molten asphalt. The invention can be useful for providing asphalt for use in locations where fumes from the molten asphalt are a concern.

BACKGROUND OF THE INVENTION

Asphalt from processing and terminalling facilities is transported to end users in one of several ways, including direct piping of molten asphalt to nearby customers, shipping in molten form via tanker truck, railcar and barge, and shipping in solid form in individual packages. The packages are used primarily by building contractors as a source of asphalt for roofing applications. The contractor typically places the solid asphalt in a heated kettle to melt the asphalt for use. Asphalt shipped in molten form is also usually further heated in a kettle prior to use.

A problem associated with such heated kettles of molten asphalt is that they can emit significant amounts of fumes. The fumes can be unsightly, and an irritant to workers and others in the surrounding area. Accordingly, it would be desirable to reduce the amount of fumes normally emitted from a kettle or other vessel of molten asphalt.

It would also be desirable to reduce fuming and odors without substantial modification of the processed or raw asphalt. By contrast with known polymermodified asphalt compositions, which are highly modified materials where the polymer is used, e.g., to impart elongation properties, an asphalt without such modification is desired for many applications.

It would also be desirable to reduce fuming and odors of molten asphalt while permitting for convenient, user-tailorable enhancement or alteration of the asphalt properties.

Furthermore, it would be desirable to produce a low-fuming asphalt in a convenient package. Individual packages of asphalt are typically formed at conventional asphalt processing facilities by pouring molten asphalt into containers made of a metal bottom and paper cylindrical sidewalls. The asphalt is typically poured at temperatures of about 177° C. and the packages are allowed to cool for up to 24 hours prior to shipping.

SUMMARY OF THE INVENTION

The above objects as well as other objects not specifically enumerated are achieved by adding a blanket material to a kettle of molten asphalt to form a skim layer.

In a preferred embodiment, a method for reducing fuming of asphalt in a heated vessel includes placing asphalt in a heated vessel to heat the asphalt to a molten state. A blanket material is added to the asphalt, the blanket material being substantially insoluble in the molten asphalt to form a skim thereon to reduce fuming therefrom.

DETAILED DESCRIPTION AND PREFERRED EMBODIMENTS OF THE INVENTION

Figure 1:
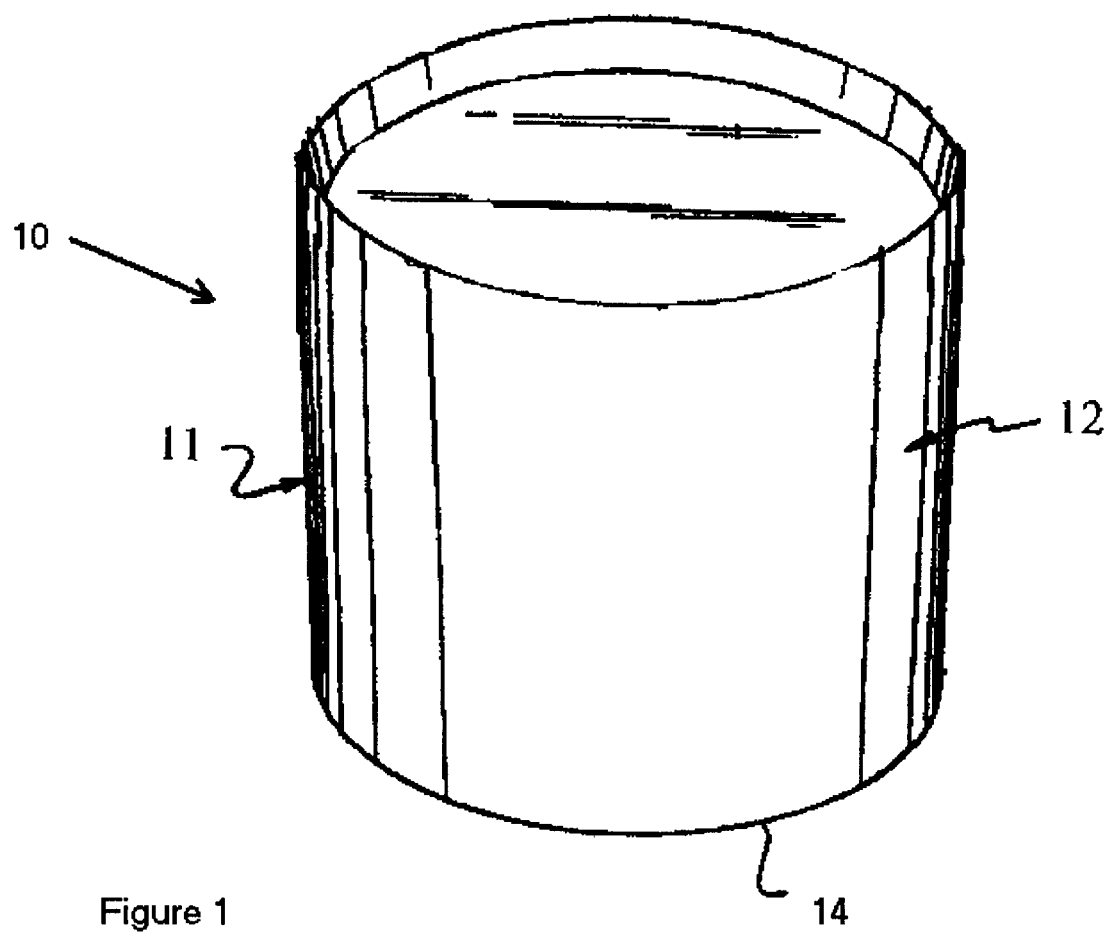
FIG. 1 is a schematic representation of a package of asphalt.

Advantageously, it has been found that the addition of a blanket material to a vessel of asphalt helps to reduce fumes emitted from a vessel of the molten asphalt. The term "vessel" means any kettle, container or other receptacle suitable for holding molten asphalt, such as a roofer's kettle, an asphalt package, a bulk storage tank, a tanker truck, a railcar or a barge. While the asphalt is being held in the vessel, it may be held for heating, storing, transporting or dispensing.

The inventors have found that it is most convenient for the end user of the asphalt to have the blanket material contained in the asphalt package. Alternatively, the blanket material may be added at the jobsite. The blanket material is intended to form a skim layer on top of the molten asphalt to reduce fuming. The term "skim" means a layer, film, or coating which floats, forms, or collects on the upper surface of the molten asphalt. Preferably, the blanket material forms a skim across at least about 80–90% of the upper surface of the molten asphalt, and more preferably across substantially the entire upper surface of the molten asphalt. It is understood that when additional asphalt is placed into the vessel, the skim may be broken but it usually quickly re-forms over the surface.

While not intending to be limited by theory, it is believed that the skim reduces fuming from the vessel by acting as a cool top or barrier to exposure of the molten asphalt to air. The thickness of the skim is a function of the addition rate of blanket material minus the blanket material's combined removal and dissolution rate. The dissolution rate is a function of fundamental blanket material properties as well as vessel temperature and agitation level. The removal rate is a function of how the asphalt is removed form the vessel as well as the effect of the vessel temperature on the blanket material. The thickness of the skim is usually from about 3 mm to about 50 mm, and typically about 13 mm, but varies greatly with the blanket material used. However, it is believed that a skim thickness of at least about 0.025 mm, more preferably greater, is suitable for reducing fuming from the vessel.

The inclusion of blanket materials to form such skims may advantageously be used with any asphalt product that is generally heated in an open kettle in preparation for its use. As used herein the term "asphalt" is meant to include asphalt bottoms from petroleum refineries, as well as naturally occurring bituminous materials such as is asphalts, gilsonite, tars, and pitches, or these same materials that have been air-blown or otherwise chemically processed or treated. For example, the asphalt can be air-blown with catalysts such as ferric chloride and the like. The asphalt can be a conventional roofing flux asphalt or a paving-grade asphalt, as well as other types of asphalts, including specialty asphalts such as water-proofing asphalts, battery compounds, and sealers. Blends of different kinds of asphalt can also be used.

The blanket material added to the asphalt can be any blanket material substantially incapable of melting and/or substantially dissolving in the asphalt, and forming a skim of sufficient viscosity on the upper surface of the molten asphalt to reduce fuming from the kettle. The blanket material should have a relative density lower than that of the asphalt so that it rises to the upper surface of a kettle of the molten asphalt. These properties should exist for at least the normal termperatures at which asphalt is heated during application. Typical temperatures are approximately 200 degrees C. to an upper temperature of about 275 degrees C., but it is preferable that such properties exist even if the asphalt is heated outside this temperature range.

Exemplary blanket materials that may be used include inert blanket materials, such as polyurethane, PET, such as ground soda bottles, Starch (such as from packaging materials), cellulose materials, such as newsprint, sawdust, wood chips, and such.

The skim is preferably viscous enough so that it stays together as a continuous layer to reduce fuming from the vessel, or thick enough to act as a blanket on top of the molten asphalt. If the viscosity of the skim is too low, or the blanket too thin, fumes from the molten asphalt could break up through holes in the skim and escape from the vessel. In contrast, if the viscosity is too high, the blanket material will not easily form a continuous skim over the entire exposed surface of the asphalt, nor redisperse or dissolve easily into the bulk asphalt over time.

Although a wide range of blanket materials are useful in the invention, as suggested from the list above, the blanket material selected for use with a particular asphalt should not undesirably modify the properties of the asphalt in the amount added, nor unduly contaminate the molten asphalt. For example, where the asphalt is intended to be used as a roofing asphalt, it is preferred that both the asphalt without (before addition of) the blanket material, and with the blanket material, meets the requirements for at least one type of roofing asphalt according to ASTM D312, more particularly ASTM D312-89. Accordingly, it is preferred that the addition of the blanket material to the asphalt reduces fuming but does not significantly change the properties of the asphalt. More preferably, the asphalt with the added blanket material meets the following ASTM D312 specifications for a Type III roofing asphalt: softening point (by ASTM D36) of 85–96° C.; flash point of 246° C. minimum; penetration (by ASTM D5) at 0° C. of 6 dmm minimum, at 25° C. of 15–35 dmm, and at 46° C. of 90 dmm maximum; ductility (by ASTM D-113) at 25° C. of 2.5 cm minimum; and solubility (by ASTM D2042) in trichloroethylene of at least 99%. Preferably the addition of the blanket material to the asphalt does not change the softening point of the asphalt by more than about 9° C., more preferably not more than about 3° C., and does not change the penetration of the asphalt by more than about 10 dmm at 25° C. More preferably, the blanket material substantially forms a blanket that floats on the top of the molten asphalt, and does not mix with the asphalt and therefore has no significant effect on the asphalt properties whatsoever. Even more preferably, the blanket absorbs some of the fumes.

The blanket material is typically added to the asphalt in an amount sufficient to reduce the visual opacity of the fumes from the vessel by at least about 25% with respect to the same asphalt without the blanket material. The visual opacity of the fumes is a measure of the blockage of natural light by the fumes. The more fumes emitted from the vessel, the higher the visual opacity. Conversely, a reduction in the visual opacity indicates a reduction in the amount of fumes emitted from the vessel. Preferably, the blanket material is added in an amount sufficient to reduce the visual opacity of the fumes by at least about 35%, more preferably at least about 50–60%, and even more preferably at least about 70–80%.

The reduction in visual opacity of the fumes increases at higher temperatures where fuming is at its worst with conventional asphalt products. Kettles of roofing asphalt are typically heated to temperatures of from about 232° C. to about 288° C. Preferably the added blanket material reduces the visual opacity of the fumes by at least about 35% at 260° C., and more preferably at least about 50% at 260° C.

Further, the total emissions of benzene soluble suspended particulates from the vessel is typically reduced by at least about 15% over the same asphalt without the blanket material. Preferably the total is reduced by at least about 25%, more preferably at least about 40–50%, and even more preferably at least about 60–70%. The total benzene soluble suspended particulate emissions is made up of the small particles of benzene soluble solid materials present in the fumes, so that a reduction in such particulate emissions indicates a reduction in the amount of fumes emitted. Preferably the total suspended particulates emissions is reduced by at least about 25% at 260° C., and more preferably at least about 50% at 260° C.

To provide a skim to achieve such reductions in fuming, the concentration of blanket material is preferably sufficient to form a skim over the entire exposed surface of the asphalt in the vessel. Preferably, the amount of blanket material added is within the range of from about 0.2% to about 6% by weight based on the total weight of the asphalt and blanket material. More preferably, from about 0.2% to about 2%, and even more preferably, from about 0.3% to about 0.5% blanket material is added based on the total weight of asphalt and blanket material. At such levels, the amount of fumes normally emitted from a vessel of the molten asphalt is significantly reduced without any significant modification of the asphalt properties.

As noted above, the blanket materials may be ground up and placed in a container of asphalt when the asphalt is formed into kegs. The blanket material may be placed on the bottom of an asphalt container and the asphalt poured onto the blanket material, or the blanket material may be added in the middle or top of the container. Alternatively, the blanket material may be added at the jobsite by adding the blanket material to the vessel of molten asphalt. One jobsite method includes shredding the paper from the shipping carton for the asphalt and putting the shredded paper into the vessel. Alternatives include having bags of blanket material at the jobsite which are added periodically to the vessel as needed. Furthermore, the present invention may be used in combination with the polymers described in commonly assigned U.S. Pat. No. 6,130,276, which is incorporated herein by reference in its entirety, or in combination with a consumable container, or with asphalt shipped in a plastic or paper wrapper or bag.

Referring now to a preferred embodiment of a consumable container for asphalt shown in the drawings, there is illustrated in FIG. 1 an asphalt package 10, including a container 11, typically having cylindrical sides 12 made of paper or cardboard, and a steel bottom 14 pressed thereon. At a jobsite, the paper 12 and bottom 14 are removed and discarded, and the asphalt 14 is thrown into a kettle.

Figure 2:
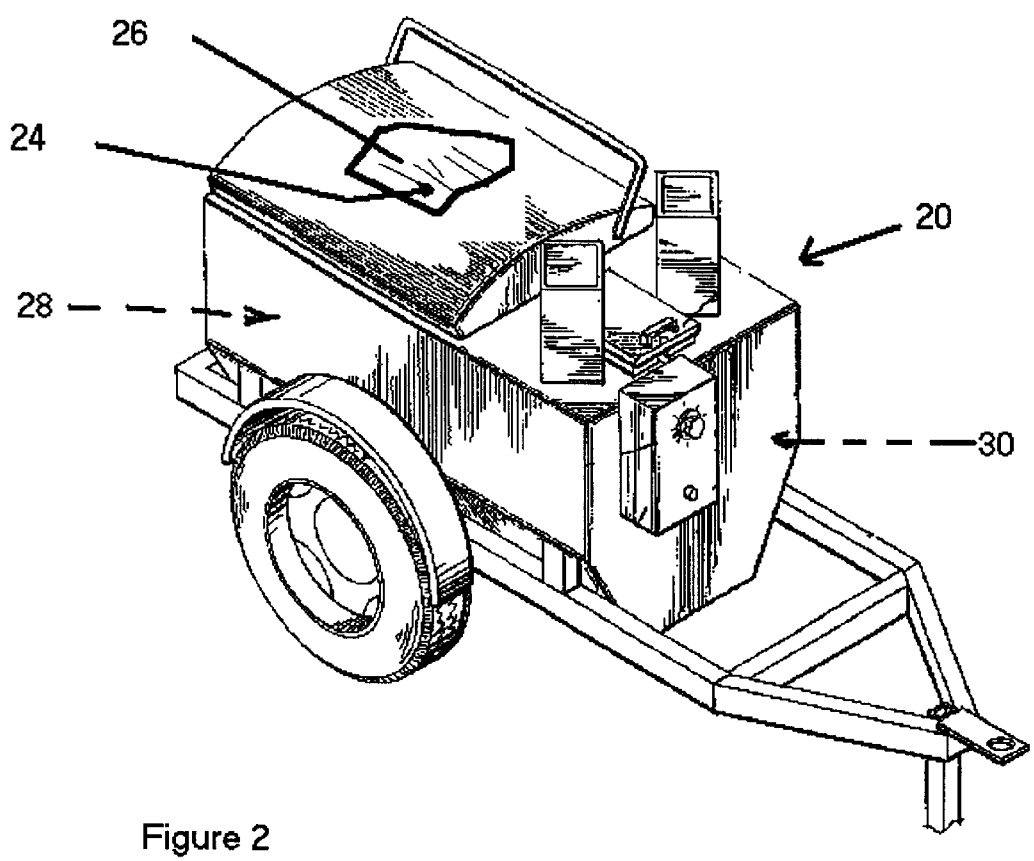
FIG. 2 is a schematic view in perspective of a kettle for melting asphalt.

FIG. 2 illustrates a vessel 20 for melting asphalt 28. The vessel 20 has walls 22 for holding the asphalt 28 and a source of heat 30 for heating the vessel to melt the asphalt 28. A blanket material 24 is added to the vessel 20 and forms a blanket layer 26 on top of the asphalt 28.

The invention will now be further illustrated by reference to the following examples.

EXAMPLE 1

Testing was conducted to measure the ability of a minor amount of blanket material added to a vessel melting a conventionally packaged asphalt product to reduce fuming from a kettle of the molten asphalt during remelting. In this test, fuming of a standard BURA Type III asphalt (Amoco roofer's flux asphalt air-blown to a softening point of from about 85° C. (185° F.) to about 96.1° C. (205° F.)), packaged in a conventional paper container, was tested both with an amount of blanket material added to the kettle ("low-fuming product"), and without the added blanket material ("standard product").

The blanket material added to the low-fuming product was prepared by cutting standard newsprint into small pieces (about 1mm square).

A gallon of type III asphalt was heated by a propane burner to 260° C. (500° F.) and the shredded newsprint was added and the mixture agitated. Approximately 8g of newsprint was added to 2.27 Kg. (5 lb.) of asphalt (0.4%) and the temperature was measured at 207° C. (405° F.). Small bubbles formed and the newsprint swelled to 2.5–5.0 cm. (1–2 inches) thick and the fumes coming off the asphalt were significantly reduced (approximately 90%).

EXAMPLE 2

The testing of Example 1 was repeated, but in Example 2, the newsprint was dried prior to adding to the vessel. The newsprint did not swell as thickly as in Example 1 and fuming was reduced to a slightly lesser magnitude.

EXAMPLE 3

The test of Example 1 was repeated, using sawdust in place of the newsprint. 2 gr. (0.088%) of sawdust was added to the asphalt and a layer was formed on top of the molten asphalt that swelled to about 2.5 cm. (1 inch) thick, and the fuming was reduced. As an additional 2 gr. Sawdust was added, the fuming was further reduced.

EXAMPLE 4

454 grams (1 lb.) of Type III asphalt was heated and 1.6 g. of polyurethane was added (CELOTEX ® board was ground into small particles), the polyurethane was not miscible, and where it covered the asphalt, fumes were reduced. It is expected that by adding enough polyurethane, a more complete layer would be formed and fuming further reduced.

EXAMPLE 5

2.5 g of PET (from ground soda bottles) was added to 454 grams (1 lb.) of Type III asphalt. The PET did not melt until about 250° C. (480° F.), and the unmelted PET reduced fuming to a small extent where a skim layer was formed.

EXAMPLE 6

2 grams of PET fibers (Hoescht Celanese L31010) was added to 454 grams (1 lb.) of Type II asphalt. Fuming was visibly reduced at 265° C. (510° F.).

EXAMPLE 7

2 g. of starch was made from broken down packaging bubbles and added to to 454 grams (1 lb.) of Type II asphalt. Fuming was reduced by about 60% at 270° C. (520° F.).

The blanket material may be added to the asphalt prior to, or during pouring into a container at the asphalt manufacture facility. Alternatively, such blanket materials may be added at the jobsite.

Breakage means, such as decried in my copending application U.S. Ser. No. 09/169,964 may be inserted inside the container adjacent the walls to provide a breakage means or other feature in the asphalt container. Such breakage means may be inserted as a rod or bar adjacent the sidewall, in place of the string illustrated in the figures, and thereby provide a means for tearing the sidewall. The same breakage means provides an indentation in the asphalt block and therefore facilitates breakage of the block, while also providing a further source of polymer in the kettle.

In a further alternative embodiment, a polymer material is added to the kettle in addition to the blanket material described herein. Such polymer material is described in commonly assigned U.S. Pat. Nos. 6,130,276, 6,107,373, 6,069,194 5,992,628 5,989,662 and U.S. Pat. No. 5,733,616, which are incorporated herein by reference. The polymers of these applications typically melt while the asphalt is heated and dissolve within the molten asphalt over time. The present invention, however, uses a blanket material which is substantially insoluble and/or not dissolved in the asphalt.

Although the invention has been described in detail in reference to preferred feature and embodiments, appropriate modifications will be apparent to the artisan. Thus, the invention is intended not to be limited by the foregoing description, but to be defined by the appended claims and their equivalents.

What is claimed is:

1. A method for reducing filming of asphalt in a heated vessel, comprising placing asphalt in a heated vessel to heat the asphalt to a molten state;

adding a blanket material to the asphalt, the blanket material being substantially insoluble in the molten asphalt to form a skim thereon to reduce fuming therefrom.

2. A method according to claim 1, wherein the blanket material remains substantially unmelted when heated to a temperature of 275 degrees C.

3. A method according to claim 1, wherein the blanket material comprises a thermoset material.

4. A method according to claim 3, wherein the blanket material comprises a cellulose material.

5. A method according to claim 4, wherein the blanket material comprises newsprint.

6. A method according to claim 4, wherein the blanket material comprises sawdust.

7. A method according to claim 4, wherein the blanket material comprises asphalt packaging material.

8. A method according to claim 1, wherein the blanket material comprises a PET material.

9. A method according to claim 1, wherein the blanket material comprises a starch material.

10. A method according to claim 1, wherein the asphalt and blanket material are placed into a vessel and heated to melt the asphalt, the molten asphalt normally emitting fumes from the vessel, and the blanket material forms a layer on top of the asphalt when the asphalt is melted in the vessel to reduce the visual opacity of the fumes by at least about 25% with respect to the same asphalt without the blanket material.

11. A method according to claim 10, wherein the skim layer expands to at least 13 mm thick.

12. The method of claim 10, wherein the amount of the blanket material is sufficient to reduce the hydrocarbon emissions of the fumes by at least about 10% of the hydrocarbon emissions from the melted asphalt in the absence of the blanket material.

13. The method of claim 10, wherein the amount of the blanket material is sufficient to reduce the total suspended particulates emissions of the fumes by at least about 10% of the total suspended particulates emissions from the melted asphalt in the absence of the blanket material.

14. A method according to claim 1, wherein the asphalt is solidified prior to being placed into the heated vessel and the blanket material is added to the asphalt after the asphalt is solidified.

15. A method according to claim 14, wherein the blanket material is added to the asphalt in the heated vessel.

16. A method according to claim 1, wherein the asphalt is solidified prior to being placed into the heated vessel and the blanket material is added to the asphalt prior to the asphalt being solidified.

* * * * *